United States Patent
Basso et al.

(10) Patent No.: US 8,576,864 B2
(45) Date of Patent: Nov. 5, 2013

(54) HOST ETHERNET ADAPTER FOR HANDLING BOTH ENDPOINT AND NETWORK NODE COMMUNICATIONS

(75) Inventors: Claude Basso, Raleigh, NC (US); Jean L. Calvignac, Raleigh, NC (US); Chih-jen Chang, Apex, NC (US); Philippe Damon, Chapel Hill, NC (US); Natarajan Vaidhyanathan, Carrboro, NC (US); Fabrice J. Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 13/011,663

(22) Filed: Jan. 21, 2011

(65) Prior Publication Data

US 2012/0192190 A1      Jul. 26, 2012

(51) Int. Cl.
*H04L 12/28* (2006.01)
*H04J 1/16* (2006.01)

(52) U.S. Cl.
USPC ............................ 370/419; 370/412; 370/463

(58) Field of Classification Search
USPC .......................................... 370/412, 419, 463
See application file for complete search history.

(56) References Cited

U.S. PATENT DOCUMENTS

| | | | |
|---|---|---|---|
| 7,181,541 B1 * | 2/2007 | Burton et al. | 709/250 |
| 7,586,936 B2 | 9/2009 | Arimilli et al. | |
| 2011/0225278 A1 * | 9/2011 | Monchiero et al. | 709/223 |

* cited by examiner

*Primary Examiner* — John Pezzlo
(74) *Attorney, Agent, or Firm* — Daniel H. Schnurmann; Jeffrey L. Streets

(57) ABSTRACT

A host Ethernet adapter (HEA) and method of managing network communications is provided. The HEA includes a host interface configured for communication with a multi-core processor over a processor bus. The host interface comprises a receive processing element including a receive processor, a receive buffer and a scheduler for dispatching packets from the receive buffer to the receive processor; a send processing element including a send processor and a send buffer; and a completion queue scheduler (CQS) for dispatching completion queue elements (CQE) from the head of the completion queue (CQ) to threads of the multi-core processor in a network node mode. The method comprises operatively coupling an Ethernet adapter to a multi-core processor system via a processor bus, selectively assigning a first plurality of packets to a first queue pair for servicing in an endpoint mode, running a device driver on the multi-core processing system, the device driver controlling the servicing of the first queue pair by dispatching the first plurality of packets to only one processor core of the multi-core processor system, selectively assigning a second plurality of packets to a second queue pair for servicing in a network node mode; and the Ethernet adapter controlling the servicing of the second queue pair by dispatching the second plurality of packets to multiple processor threads.

20 Claims, 5 Drawing Sheets

HOST ETHERNET ADAPTER FOR HANDLING BOTH ENDPOINT AND NETWORK NODE COMMUNICATIONS

BACKGROUND

1. Field of the Invention

The present invention relates to a host Ethernet adapter, and a method of handling both endpoint communications and network node communications.

2. Background of the Related Art

Many computer systems include a plurality of individual computers or servers that communicate over a network, such as an Ethernet network. Packets of data are sent from computer to computer over an Ethernet network in accordance with one of various communication protocols, such as Transmission Control Protocol (TCP) and Internet Protocol (IP). Each computer in the network will include a host Ethernet adapter (HEA) designed to facilitate communications that terminate at an operating system (OS) running on the computer. Each operating system will include a device driver that interacts with the HEA. In this environment, receive queues are serviced by a single device driver (DD). Although a device driver can be running on several processors within the computer, the device drivers are interlocked so that there is only one processor servicing a particular receive queue at a time. In this model, the device driver draws elements from a receive queue and is responsible for dispatching the work to the processors.

The speed of network communications has increased over time, such that 10 gigabit per second speed for network TCP/IP communications is now common. This high speed, combined with ever increasing volumes of traffic, consume tremendous processing and memory bandwidth in a computer. For example, where the computer is a server running client applications, the processing and memory bandwidth dedicated to handling network communications can limit the server's ability to run applications.

BRIEF SUMMARY

One embodiment of the present invention provides a method of managing network communications. The method comprises operatively coupling an Ethernet adapter to a multi-core processor system via a processor bus, selectively assigning a first plurality of packets to a first queue pair for servicing in an endpoint mode, running a device driver on the multi-core processing system, the device driver controlling the servicing of the first queue pair by dispatching the first plurality of packets to only one processor core of the multi-core processor system, selectively assigning a second plurality of packets to a second queue pair for servicing in a network node mode; and the Ethernet adapter controlling the servicing of the second queue pair by dispatching the second plurality of packets to multiple processor threads.

Another embodiment of the present invention provides a host Ethernet controller comprising a host interface configured for communication with a multi-core processor over a processor bus. The host interface comprises a receive processing element including a receive processor, a receive buffer and a scheduler for dispatching packets from the receive buffer to the receive processor; a send processing element including a send processor and a send buffer; and a completion queue scheduler (CQS) for dispatching completion queue elements (CQE) from the head of the completion queue (CQ) to threads of the multi-core processor in a network node mode.

A further embodiment of the invention provides a computer program product including computer usable program code embodied on a computer usable storage medium for controlling an Ethernet adapter coupled to a multi-core processor system via a processor bus. The computer program product comprises computer usable program code for selectively assigning a first plurality of packets to a first queue pair for servicing in an endpoint mode, computer usable program code for running a device driver on the multi-core processing system, the device driver controlling the servicing of the first queue pair by dispatching the first plurality of packets to only one processor core of the multi-core processor system, computer usable program code for selectively assigning a second plurality of packets to a second queue pair for servicing in a network node mode; and computer usable program code for the Ethernet adapter controlling the servicing of the second queue pair by dispatching the second plurality of packets to multiple processor threads.

DETAILED DESCRIPTION

Figure 1:
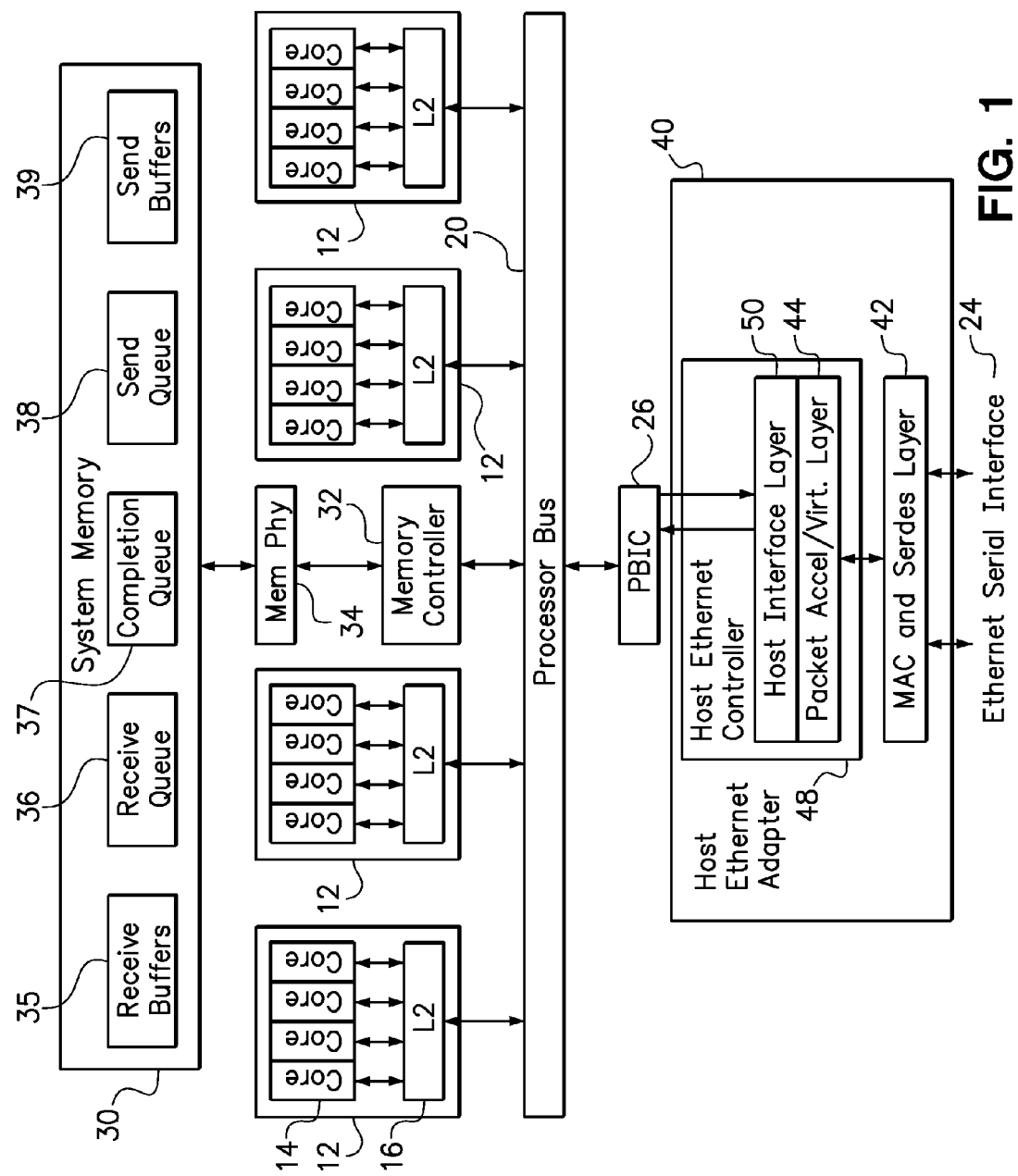
FIG. 1 is a block diagram of a host Ethernet adapter installed in a computer system having multiple processors.

One embodiment of the present invention provides a method of managing network communications. The method comprises operatively coupling an Ethernet adapter to a multi-core processor system via a processor bus, selectively assigning a first plurality of packets to a first queue pair for servicing in an endpoint mode, running a device driver on the multi-core processing system, the device driver controlling the servicing of the first queue pair by dispatching the first plurality of packets to only one processor core of the multi-core processor system, selectively assigning a second plurality of packets to a second queue pair for servicing in a network node mode; and the Ethernet adapter controlling the servicing of the second queue pair by dispatching the second plurality of packets to multiple processor threads. The endpoint mode provides facilities for a device driver to terminate connections and assemble data provided in separate frames into a stream of data suitable for application processing. The network node mode provides facilities for the hardware of the host Ethernet adapter to receive and forward frames efficiently and at high speed.

The host Ethernet adapter may be installed in a computer system having one or more multi-core processors, where each of the multiple cores can run one or more threads. Accordingly, selectively operating an Ethernet adapter in an endpoint mode that allows only one processor core of a multi-core processor system to service a particular receive queue, may include selectively operating an Ethernet adapter in an endpoint mode that allows only one thread of one processor core of a multi-core processor system to service a particular receive queue. In other words, packets in a receive queue may be directed solely to a particular processor core or a particular thread of a particular processor core. By contrast, selectively operating the Ethernet adapter in a network node mode that causes multiple processor threads to service a single receive queue, may include selectively operating the Ethernet adapter in a network node mode that causes multiple processor threads across multiple processor cores to service a single receive queue. In other words, packets in a receive queue may be directed to, and serviced by, multiple processor cores or multiple threads of multiple processor cores.

The host Ethernet adapter may be operated to simultaneously service a first queue pair in an endpoint mode and service a second queue pair in a network node mode. For example, packets may be assigned to a first set of queue pairs in order to be serviced in network node mode, and other packets may be assigned to a second set of queue pairs in order to be serviced in endpoint mode. Whether particular packets are serviced in EP mode or NN mode may be determined by the configuration of queue pair (QP) and completion queue (CQ) registers. More specifically, packets may be directed to a first queue pair for servicing in EP mode or directed to a second queue pair for servicing in NN mode on the basis of the particular application to which the packets are directed. For example, packets directed to a database application would be assigned to a queue pair for servicing in EP mode, whereas packets directed to a routing or firewall application would be assigned to a queue pair for servicing in NN mode. The packets may be assigned to a QP on the basis of packet classification which is performed in the Rx Acceleration layer. For example, the QP assignment could be based on a destination MAC address or higher layer protocol fields.

In endpoint mode, a device driver running on the multi-core processor system controls the flow of data from the receive queue to one of the processor cores. The device driver further controls the buffers in which data is placed in the endpoint mode.

In network node mode, by contrast, the host Ethernet adapter controls the flow of data from the single receive queue to the two or more of the multiple processor threads. To implement the network node mode, the host Ethernet adapter may include a completion queue scheduler (CQS) for dispatching completion queue elements (CQE) from the head of the completion queue (CQ) to threads of the multi-core processor. While in network node mode, the processor core automatically pushes data to the send queue in the Ethernet adapter.

After the completion queue scheduler (CQS) has dispatched work queue elements to multiple processor threads from a single receive queue in network node mode, the method may further include the multiple processor threads servicing the multiple work queue elements, and transferring packet data associated with the multiple work queue elements to the send queue Packets that are not being terminated at the compute node will be forwarded without further processing of the data. Accordingly, packet headers may be sent to the processor threads while the packet data is simply buffered for retransmission.

Embodiments of the host Ethernet adapter may use the same receive queue, send queue and/or completion queue in both the endpoint mode and the network node mode. Using the same queues for both modes makes efficient use of hardware and simplifies the operation of the host Ethernet adapter. For example, the simultaneous servicing of some packets in endpoint mode and other packets in network node mode is simplified since the endpoint packets and network node packets use the same queues. Furthermore, the present host Ethernet adapter is still capable of wrapping packets from a send processing element to a receive processing element.

In a preferred option, the host Ethernet adapter operates with a fixed number of send and receive queues, such as 128 total queues (i.e., 64 queue pairs), that are reused. In network node mode, packets are received into a receive queue and sent from a send queue. Upon complete transmission of the data from a send buffer, the empty send buffer may be automatically requeued onto the receive queue. The send queue replenisher (SQR) is used in network node mode to place work queue elements (WQE) which have been ordered by the completion unit (CU) onto the tail of the send queue (SQ). The job of placing work queue elements onto the tail of the send queue is performed by software (i.e., the device driver) in endpoint mode. The send queue replenisher is also responsible for dequeuing WQE from the head of the send queue (SQ) when the send processor is ready to process a WQE. Optionally, a small pool or cache of WQE per queue pair (QP) may be provided to avoid write and read to/from system memory.

The method preferably includes assigning a queue pair number to each packet that is received by the receive buffer. The queue pair number provides an index into the queue pair table, which provides context information for each queue pair, such as the SQ head pointer, RQ head pointer, SQ page table pointer, RQ page table pointer, and the like.

The method may also include assigning a flow identification to a plurality of packets received in the receive buffers in the network node mode, and using the flow identification to assure that the plurality of packets are transmitted in the same order that they were received. Optionally, the flow identification may be generated as a function of the packet contents, such as a hash of certain packet header data. The completion unit (CU) is then used to put the frames in order before placement into the send queue (SQ) by the send queue replenisher (SQR).

The send and receive queues are typically stored in system memory. Accordingly, the receive packet processor will preferably send packets to the system memory using direct memory access, and the send processor will preferably obtain packets from the system memory using direct memory access.

Another embodiment of the present invention provides a host Ethernet controller comprising a host interface configured for communication with a multi-core processor over a processor bus. The host interface comprises a receive processing element including a receive processor, a receive buffer and a scheduler for dispatching packets from the receive buffer to the receive processor; a send processing element including a send processor and a send buffer; and a completion queue scheduler (CQS) for dispatching completion queue elements (CQE) from the head of the completion queue (CQ) to threads of the multi-core processor in a network node mode.

A preferred host Ethernet adapter or controller includes a completion unit (CU) for managing the ordering of packets flowing through the host interface in the network node mode. Since network node packets are resent after being received by the host Ethernet adapter and are processed by several threads which may complete the task at different speeds, it is important that the packets are resent in the same order that they were received. The completion unit (CU) enforces an ordering mechanism to ensure that the packets are put into order before being resent.

The host Ethernet adapter or controller may also include a coprocessor command checker for monitoring the processor bus and taking coprocessor commands off the bus. For example, the coprocessor command checker may be an ICSWX checker (ICS) that takes the coprocessor commands off the bus, checks the coprocessor commands for validity, and sends the coprocessor commands to either the receive queue replenisher (RQR) or the completion unit (CU). ICSWX is a PowerPC co-processor instruction to send data to a co-processor. Accordingly, the ICSWX command can be used to send data to a receive processor or a send processor with the host Ethernet adapter. The used of a coprocessor command in network node (NN) mode allows threads to independently indicate that a work queue element (WQE) is ready to be placed on the send queue (SQ), without actually controlling the head of the SQ. In network node mode, it is the send queue replenisher (SQR) hardware of the host Ethernet adapter that controls the head of the SQ.

Still further, the host Ethernet adapter or controller may include a send queue replenisher (SQR) for enqueuing and dequeuing buffers to the send queue, and a receive queue replenisher (RQR) for enqueuing and dequeuing buffers to the receive queue. The send queue replenisher and the receive queue replenisher are responsible for controlling the tail of the send queue (SQ) and receive queue (RQ), respectively, in network node mode, whereas the software handles this responsibility in endpoint mode.

The host Ethernet adapter (HEA) of the present invention provides for an endpoint (EP) mode of operation in which packets are delivered to a compute node for processing, and other packets are sent out from the compute node, perhaps as a result of processing. In the endpoint mode, a device driver (DD) of an operating system (OS) services the completion queue (CQ) one element at a time to receive frames. Likewise, the single device driver places elements onto the tail of the send queue (SQ) to send frames. All applications running on the compute node must funnel data through a single access point to the head of the completion queue (CQ) in order to send and receive packets. In addition, buffers are managed by facilities of an operating system (OS). When frames are received, the buffers can be linked into chains of buffers forming a connection data stream. After the application consumes the buffers, they are returned to a pool of operating system buffers. Similarly during transmission, as an application needs to form a stream of transmit data, it takes a buffer from the OS pool and chains it to a stream of data. The device driver (DD) pulls buffers from this chain and sends them to the HEA. After transmission, the HEA returns the buffers to the DD and the DD returns them to the OS pool.

Optionally, the receive queue (RQ), send queue (SQ) and completion queue (CQ) can be replicated for each partition (OS) sharing the adapter port. A de-multiplexing layer in the hardware can direct received frames to a particular RQ based on packet header characteristics. This allows for virtualization of the host Ethernet adapter in support of multiple operating system instances. This mode works well for endpoint applications where a small number of threads are processing elements from a single completion queue.

The host Ethernet adapter of the present invention also provides for a network node (NN) mode of operation in which packets are forwarded on to another Ethernet link after some processing of the packet header. In a network node environment, a large number of connections may exist, but the connections are not terminated. Furthermore, wire speed processing should be maintained, for example by employing multiple processor threads to process a single stream of data. The multiple processor threads may be implemented on different cores of a multi-processor system. In network node architecture, it is not efficient to have the processors sharing access to a single completion queue (CQ) and a single send queue (SQ) as is the case in endpoint (EP) mode.

The host Ethernet adapter uses much of the same hardware and data structures, such as the send queue (SQ), receive queue (RQ) and completion queue (CQ), in the network node mode as in the endpoint mode, such that both endpoint functionality and network node functionality can co-exist in the same system without duplication of hardware or links. This also facilitates use of a software interface that is common to both endpoint and network node modes. Optionally, the host Ethernet adapter is able to simultaneously operate in both network node mode and endpoint mode. For example, certain queue pairs may be handled in endpoint mode and other queue pairs may be handled in network node mode.

The structures of the host interface are adapted to a new host interface model which preferably allows for:

1. Hardware dispatching of work to threads which are assigned to a particular type of work.
2. Mechanism for hardware to know if threads are busy.
3. Mechanism for threads to push frame buffers to the hardware without waiting for acknowledgement.
4. Mechanism to maintain original ordering among the multiple threads assigned to a CQ.
5. Mechanism to automatically replenish buffers to a receive queue when the send operation is complete.

In one embodiment of the invention, both network node mode and endpoint mode reuse all structures of the MAC/Serdes Layer and the Packet Acceleration and Virtualization Layer, and many of the structures in the Host Interface Layer. Examples of structures in the Host Interface Layer that are use in either mode include: Receive Queues, Send Queues and Completion queues including the associated control structures (QP context and CQ context); virtualization protection mechanisms; Receive Processor (RPP), Send Processors (SQM), DMA engines, Context managers (CQCM, QPCM); receive buffers and send buffers; bus interface components including GIS; scheduling components including DBM and Scheduler; and register access interface (REGs).

In a further example, the host Ethernet adapter components that are used in the endpoint (EP) mode are adapted for use in the network node (NN) mode as follows:

HEA-managed Send Queues re-use the EP SQ by replacing the software enqueue through REGs and DBM (adder) with the coprocessor (i.e., the send processor) initiated enqueue going though ICS and CU.

HEA-managed Receive Queues re-use the EP RQ, where the receive queues (RQs) are replenished via the send processors and receive queue replenisher (RQR) rather than using the REGs and DBM (adder). Receive queues can also be replenished using the coprocessor command going through ICS.

HEA-managed Completion Queues re-use the EP CQ. Instead of software managing the head of the queue, the completion queue scheduler (CQS) manages the head and de-queues completion queue elements (CQE) and dispatches CQE by "shooting" them to thread mailboxes.

Thread-to-thread communication is accomplished through use of the completion queue (CQ). The new coprocessor interface (including ICS and CU) communicates with the completion queue manager (CQM) to generate a "user CQE" on a completion queue (CQ) but adding the new ordering features.

Use of the receive parser/filter/classifier (BPFC), which is part of the Packet Acceleration and Virtualization Layer, to determine hash which is used for ordering control in the host interface layer.

Use of BPFC to classify and direct frames to the correct queue pair (QP) and associated completion queue (CQ).

The CQ is then used as a first-in-first-out (FIFO) list of work to be dispatched to threads assigned to work on those flows. This classification mechanism is used in endpoint (EP) mode, but for network node (NN) mode the CQ is associated with a set of threads (i.e., within the completion queue scheduler (CQS)).

Use of the send queue (SQ) and the receive queue (RQ) for fill-spill of work queue elements (WQE) to hardware managed pools. The send queue replenisher (SQR) and the receive queue replenisher (RQR) re-use the SQ and RQ as spill-fill areas, attempting to keep enough WQE pre-fetched to reduce latency. A bypass is also available when the pool is large enough to keep the entire queue. The same virtualization protection mechanisms are re-used from EP mode.

In a further embodiment, the network node mode is implemented in a host Ethernet adapter (HEA) by including a completion unit (CU) to manage ordering of packets flowing through HEA, a send queue replenisher (SQR) to enqueue and dequeue to hardware managed send queues, a receive queue replenisher (RQR) to enqueue and dequeue to hardware managed receive queues, ICSWX checker (ICS) to take coprocessor commands off the processor bus, and a completion queue scheduler (CQS) to dispatch completion queue elements (CQE) to processor threads according to a scheduling algorithm.

A further embodiment of the invention provides a computer program product including computer usable program code embodied on a computer usable storage medium for controlling an Ethernet adapter coupled to a multi-core processor system via a processor bus. The computer program product comprises computer usable program code for selectively operating the Ethernet adapter in an endpoint mode that allows only one processor core of the multi-core processor system to service a particular receive queue, and computer usable program code for selectively operating the Ethernet adapter in a network node mode that causes multiple processor threads to service a single receive queue.

The host Ethernet adapter may be installed in a network interface card, wherein the host Ethernet adapter is installed in communication with an interface adapted to be coupled to a processor bus.

The host Ethernet adapter may also be installed in a computer server, wherein the server comprises a processor coupled to a processor bus, memory coupled to the processor bus, and a network interface card coupled to the processor bus. The network interface card includes the host Ethernet adapter of any of the foregoing embodiments.

FIG. 1 is a block diagram of a host Ethernet adapter 40 installed in a computer system 10 having multiple processors 12. In the example shown, each of the processors 12 has multiple cores 14 and a shared L2 cache 16. A processor bus 20 handles communications to and from the processor 12, as well as communications to and from system memory 30. A memory controller 32 is coupled to the processor bus 20 and manages read and writes to system memory 30 through the Memory Physical Layer (Mem Phy) 34. The system memory 30 is shown as including receive buffers 35, a receive queue 36, a completion queue 37, a send queue 38, and send buffers 39 that facilitate the functionality of the host Ethernet adapter 40.

The host Ethernet adapter (HEA) 40 includes a media access control (MAC) and serializer/deserializer (Serdes) Layer 42 in direct communication with the Ethernet serial interface 24. Packets received by the MAC and Serdes Layer 42 are passed up to the Packet Acceleration and Virtualization Layer 44, and then to the Host Interface Layer 50. The Host Interface Layer 50 and the Packet Acceleration and Virtualization Layer 44 may be referred to collectively as a Host Ethernet Controller 48 and may be embodied as an application specific integrated circuit (ASIC). However, it is the Host Interface Layer 50 that communicates through the PBIC 26 to the processor bus 20. Optionally, everything in FIG. 1 except the system memory may be implemented as a single ASIC.

Figure 2:
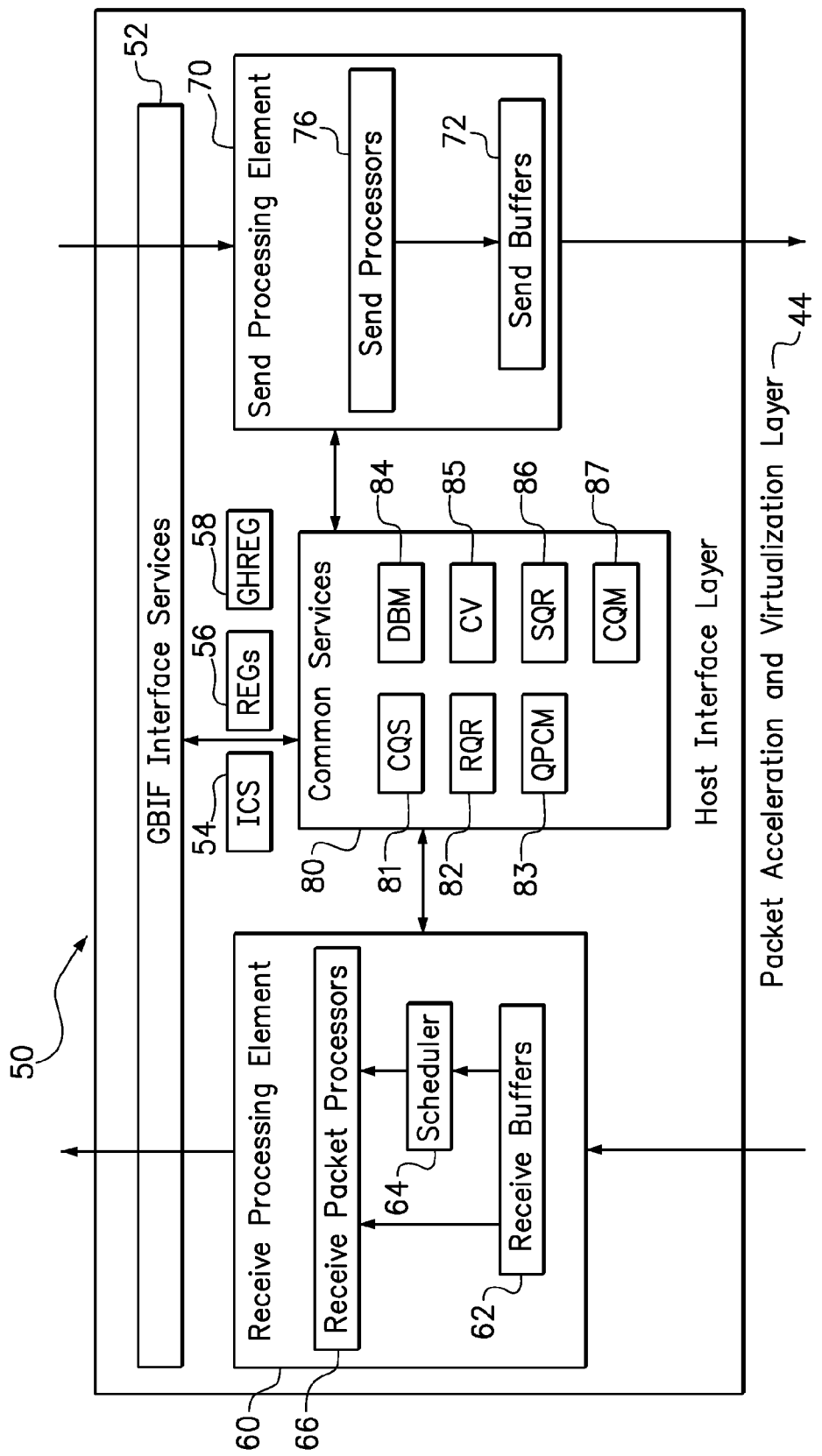
FIG. 2 is a block diagram of a host interface layer of a host Ethernet adapter in accordance with one embodiment of the invention.

FIG. 2 is a block diagram of a host interface layer 50 of a host Ethernet adapter 40 in accordance with one embodiment of the invention. A receive processing element 60 includes receive buffers 62, scheduler 64, and one or more receive packet processors 66. The receive processing element 60 receives packets from the Packet Acceleration and Virtualization Layer 44 and communicates data to the processor bus 20 (See FIG. 1) through the GBIF Interface Services 52. Similarly, a send processing element 70 includes send buffers 72, and one or more send processors 76. The send processing element 70 receives packets from the processor bus 20 (See FIG. 1) through the GBIF Interface Services 52 and communicates data to the Packet Acceleration and Virtualization Layer 44.

A group of common services 80 includes completion queue scheduler (CQS) 81, receive queue replenisher (RQR) 82, queue pair context manager (QPCM) 83, doorbell manager (DBM) 84, completion unit (CU) 85, send queue replenisher (SQR) 86, and completion queue manager (CQM) 87. These services interact with the receive processing elements 60 and the send processing element 70 to accomplish the functionality of the host interface layer 50.

The host interface layer 50 also includes an ICSWX checker (ICS) 54 to take coprocessor commands off the processor bus. The register access interface (REGs) 56 and the general purpose registers (GHREG) 58 are provided to store various data and keep it available to the components of the host interface layer 50.

In operation, packet data is forwarded from the Packet Acceleration and Virtualization Layer 44 to the receive buffers 62 of the Host Interface Layer 50. When there is a receive packet processor (RPP) 66 ready to process a packet, the scheduler 64 dispatches the packet to a receive packet processor (RPP) for processing. The packet flows through the receive packet processor (RPP) 66 and may be sent via direct memory access (DMA) to the system memory (see system memory 30 in FIG. 1) via the GBIF Interface Services (GIS) 52. The packet may be stored in system memory as part of a receive queue (RQ) (see receive queue 36 in FIG. 1).

Packet data on the transfer/send side enters from system memory via the GBIF Interface Services 52. The send buffers 72 receive packet data through direct memory access until the entire packet has been received. After validating the data, the packet may be forwarded either to the MAC (through the Packet Acceleration and Virtualization Layer 44) for transmit on the physical port or wrapped back to the receive processing element 60.

As a packet is processed, control information flows between HEA components and to and from system memory. The Packet Acceleration and Virtualization Layer 44 parses the packet and passes control information through the receive buffers 62 to the scheduler 64 and receive packet processor 66. The control information includes packet metadata as well as the queue pair (QP) number to be used.

The central control point of the receive processing element 60 is the receive packet processor (RPP) 66. In processing the packet, the RPP 66 requests QP context from the queue pair context manager (QPCM) 83. The QP context includes state information about the queue pair. The QPCM 83 may in turn have to fetch the context from system memory through the GIS.

The RPP 66 may fetch a Work Queue Element (WQE) from a receive queue in system memory. Alternatively, the RPP may obtain a WQE from the receive queue replenisher (RQR) 82 if the QP is working in Network Node (NN) mode. In the case that the QP is working in Network Node mode, the completion unit (CU) 85 may be used to obtain an ordering ticket for the packet.

The RPP 66 may request the services of the completion queue manager (CQM) 87 to post packet reception completion. The CQM 87 writes the completion queue element (CQE) to system memory. The CQM 87 may in invoke a completion queue scheduler (CQS) 81 that dispatches completion queue elements (CQE) to processor threads according to a scheduling algorithm The CQM 87 may also invoke an event queue manager (EQM) (not shown) to create an event queue element (EQE) if needed to wake the software.

The RPP 66 may update the queue count using the doorbell manager (DBM) 84 if the QP is operating in Endpoint (EP) mode rather than Network Node (NN) mode. The transmit flow initiates by the device driver software creating a work queue element (WQE) and enqueuing it to the host Ethernet adapter (HEA) either via an ICSWX coprocessor command in Network Node mode or by writing directly to the send queue (SQ) and ringing a doorbell in Endpoint mode.

In Network Node mode, the completion unit (CU) 85 accepts the ICSWX coprocessor command containing the work queue element (WQE) and performs ordering operations on the WQE. When the WQE is ready to be transmitted, the completion unit (CU) 85 places the WQE onto the send queue (SQ). The doorbell manager (DBM) 84 schedules the work queue elements on the send queue for processing by assigning the relevant queue pair (QP) to a send processor 76 for processing. The send processor(s) 76 is the central control point for transmit packet processing. Once dispatched, a send processor 76 requests the QP context from the queue pair context manager (QPCM) 83. The QPCM 83 may in turn have to fetch the QP context from system memory.

The send processor 76 may fetch a work queue element (WQE) from a send queue (SQ) in system memory. Alternatively, the receive packet processor (RPP) 66 may obtain a WQE from the send queue replenisher (SQR) 86 if the QP is working in Network Node mode.

The send processor 76 requests a DMA read of the packet data from system memory, and provides instructions to the send buffer 72 so that when the send buffer receives the packet data from system memory, the packet data can be directly placed into output buffers by the send buffer 72.

The send processor 76 may return the packet buffer to the receive queue by interfacing to the receiver queue replenisher (RQR) 82 if operating in Network Node mode. Alternatively, the send processor 76 may interface with the completion queue manager (CQM) 87 to generate a completion queue element (CQE) for the packet.

Figure 3:
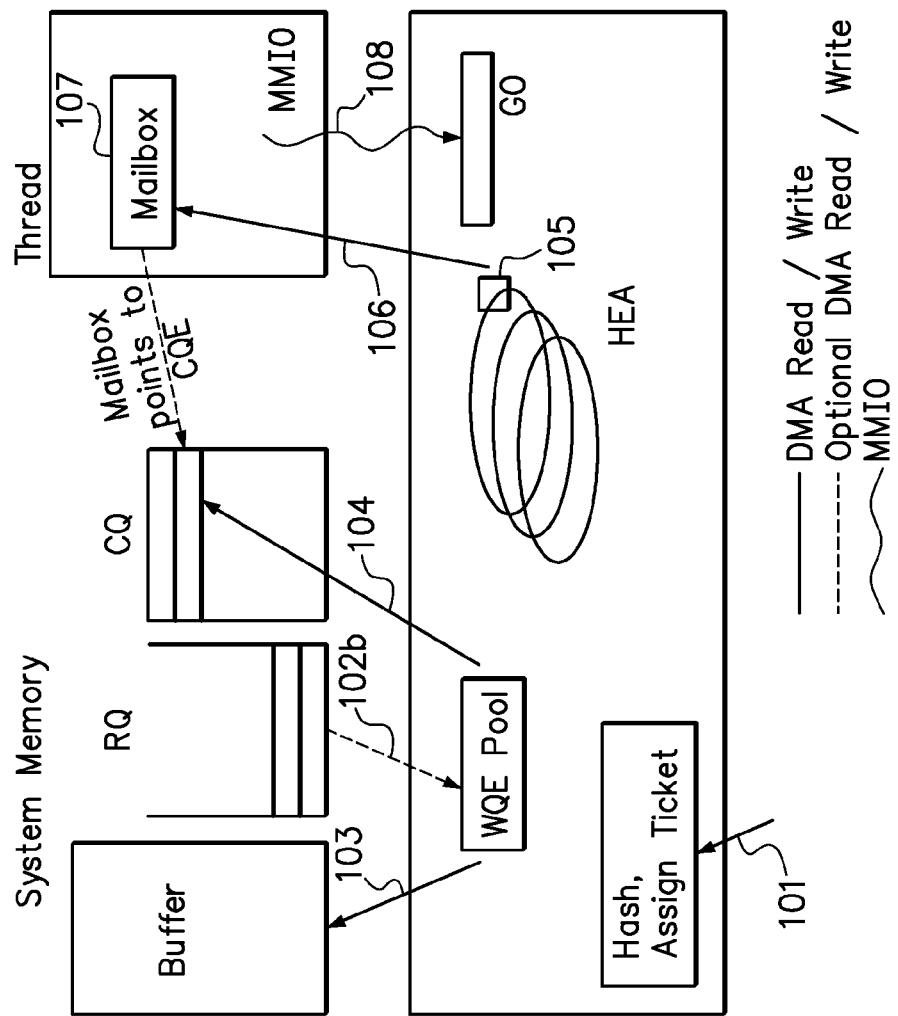
FIG. 3 is a schematic diagram showing the network node receive flow.

FIG. 3 is a schematic diagram showing the network node receive flow. In step 101, a packet arrives into the HEA. In the Packet Acceleration and Virtualization Layer, the packet is parsed, meta-data is extracted, and a hash is performed to place the packet into an order list. Next, an appropriate receive queue (RQ) is determined based on parsing of packet. If there is a work queue element (WQE) available, then the WQE is taken from the RQ pool, but otherwise (as shown in step 102b) the WQE is obtained via direct memory access of a cache line from the RQ head into the pool. In step 103, the data is written via direct memory access (i.e., DMA'd) to a buffer pointed to by the WQE. In step 104, a completion queue element (CQE) is built and DMA's to the completion queue (CQ). The completion queue element will contain meta-data, a reference to the WQE and an ordering ticket or identification. In step 105, the completion queue is activated for scheduling. After the completion queue is scheduled, a completion queue element (CQE) pointer, as well as the ordering ticket and a timestamp, is injected into the mailbox of an available thread, according to step 106. In step 107, the thread is awakened to read the mailbox, load the completion queue element (CQE), and process the packet. When the thread has completed processing of the packet, the thread sets a GO bit for the thread in the HEA in step 108.

Figure 4:
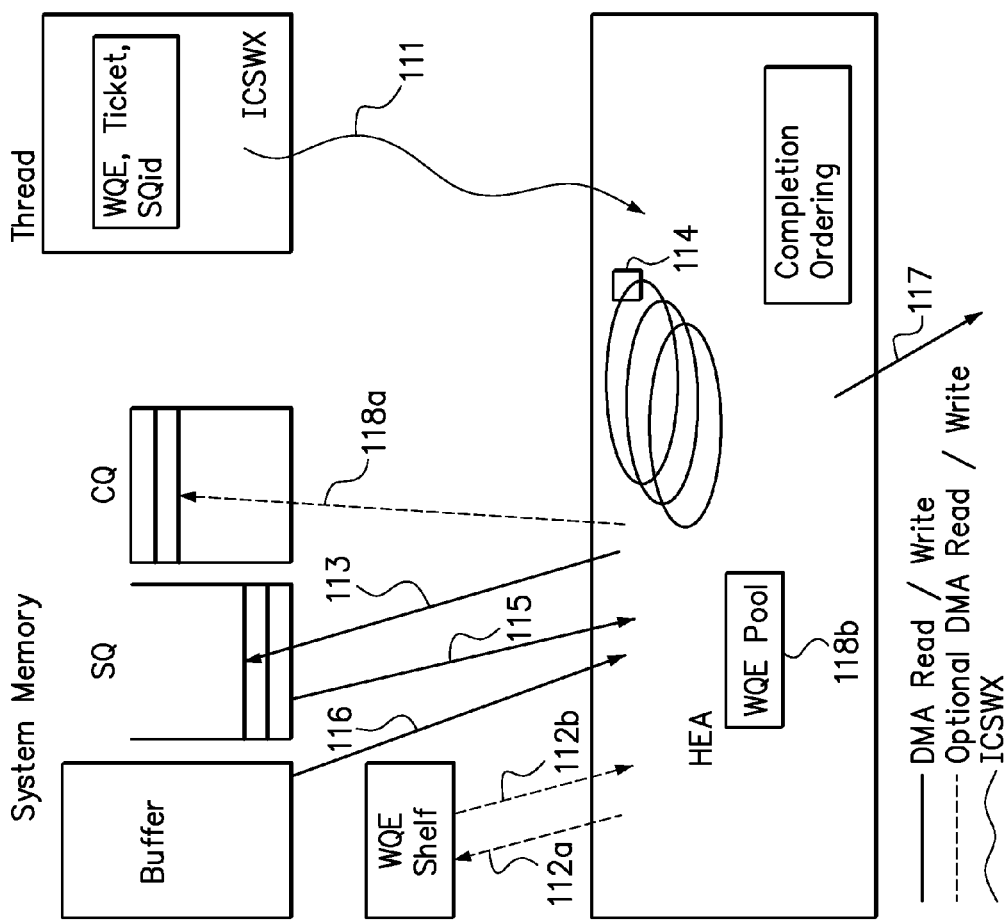
FIG. 4 is a schematic diagram showing the network node transmit flow.

FIG. 4 is a schematic diagram showing the network node transmit flow. In step 111, a thread builds a send work queue element (WQE) and sends it to the HEA along with an ordering ticket and send queue (SQ) identification using an ICSWX coprocessor command. The HEA checks for ordering constraints and if there are prior tickets on the list that have yet to be enqueued, then, in step 112a, the current ticket is held in a list and the WQE is saved on an on-chip repository (i.e., the WQE shelf). Then, when the ticket gets to the head of the order list, the WQE is retrieved from WQE shelf in step 112b. In step 113, the WQE is enqueued to the tail of the send queue (SQ). Note that there is a small pool of WQE in the HEA which collects a cache line worth of the WQE before a DMA is performed. Also, if the SQ is nearly empty, then the DMA may not be needed. In step 114, the queue pair (QP) is placed on the transmit scheduling ring. When the queue pair (QP) has been scheduled, the WQE is read from the SQ (memory or pool) in step 115. Buffer data is DMAed in step 116 and the packet is sent in step 117. The send buffer is then handled, either by placing a completion queue element (CQE) on the completion queue (CQ) in step 118a or, in accordance with step 118b, adding the send buffer to a receive queue (RQ) WQE pool or (if the RQ WQE is full) placing the send buffer at the tail of the receive queue (RQ).

Figure 5:
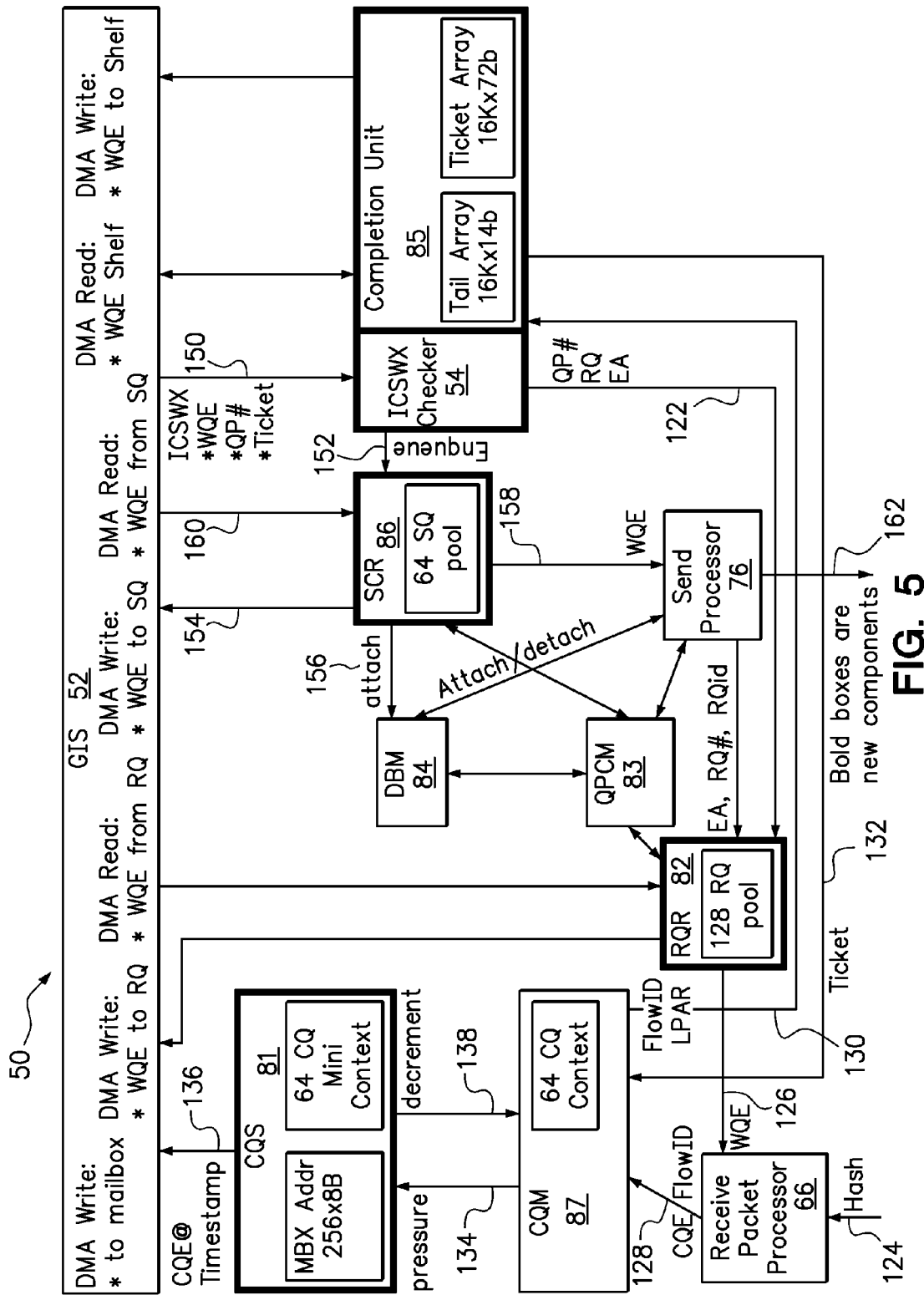
FIG. 5 is a block diagram illustrating network node data flows.

FIG. 5 is a block diagram of the host interface layer 50 illustrating network node data flows. As shown in FIG. 5, the host interface layer shows most of the elements of FIG. 2. Reference numbers have been carried over for convenience, where like numbers represent like elements.

In the receive flow, software pre-allocates receive buffers (RB) by sending an enqueue receive queue (RQ) coprocessor commands (ICXSWX) passing the QP number, RQ number (1 or 2) and the buffer address (see data flow 122). The ISCWX checker 54 receives the command and performs protection checks. The receive queue replenisher (RQR) 82 then processes the ICSWX and replenishes the indicated receive queue (RQ). The receive packet processor (RPP) 66 receives a packet (see data flow 124) to process from the scheduler (not shown; see received buffers 62 and scheduler 64 in FIG. 2). The QP context indicates that the receive queue (RQ), to which the packet is assigned, is hardware managed. In this case, rather than read a WQE from memory, the receiver processor 66 requests a WQE from the receiver queue replenisher (RQR) 82, either from RQ1 or RQ2 depending on threshold settings. The RQR 82 can, if necessary DMA a work queue element (WQE) from the RQ in system memory if the RQR 82 does not have any available in the local pool (cache). Accordingly, the RQR 82 returns a compact WQE giving the address of the buffer (see data flow 126).

The receive packet processor (RPP) 66 DMAs the packet data to the identified buffer, and forwards completion queue element (CQE) contents to the completion queue manager (CQM) 87 along with the flow ID that was passed from BFSM (not shown). If the completion queue (CQ) is configured for ordering support and the CQM 87 receives a flow ID from the receive packet processor (RPP) 66, then the CQM 87 requests a ticket from the completion unit (CU) 85 giving the LPAR ID and FlowID (see data flow 130). The completion unit (CU) 85 provides a ticket to the CQM 87 (see data flow 132) from the allocation for the given LPAR. If no tickets are available an indication is returned to CQM. The CQM 87 places the ticket (if available) and a ticket valid flag into the CQE. The CQM 87 DMAs the completion queue element (CQE) to the CQ tail. A pressure signal is then provided from the CQM 87 to the completion queue scheduler (CQS) 81 (see data flow 134) indicating that the completion queue (CQ) is not empty. The completion queue scheduler (CQS) 81 schedules completion queues (CQs) with pressure. A thread is chosen for dispatch according to the thread availability and thread mask configuration using the CQS's 81 scheduling algorithm. Accordingly, the CQS 81 pushes the CQE address and timestamp to the thread mailbox area (see data flow 136). Then, the CQS requests a completion queue (CQ) count decrement to the completion queue manager (CQM) 87 (see data flow 138) and updates its tail pointer.

The transmit flow is as follows: the software issues an enqueue send queue (SQ) with ticket coprocessor command (ICSWX) containing the QP number, the ticket number and the WQE (see data flow 150). The ISCWX checker 54 receives the command and performs protection checks, and the completion unit (CU) 85 processes the ICSWX. If the ticket is at the head of its flowID list, then the WQE is immediately enqueued to the send queue (SQ) by passing it to send queue replenisher (SQR) 86 (see data flow 152). However, if the ticket is not at the head of its flowID list, then the WQE is saved until the ticket moves to the head. Once received by the SQR 86, the work queue element (WQE) is enqueued to the indicated send queue (SQ) (see data flow 154). The SQR receives the WQE either into its E-pool or, if that is full, it may DMA the WQE along with 3 others saved in the D-pool to the tail of the SQ. If the send queue (SQ) is going from empty to non-empty, the SQR 86 may request that the SQ be attached to the scheduling ring by the doorbell manager (DBM) 84 (see data flow 156). The SQ is then scheduled by the DBM 84 to be processed. The send processor 76 is dispatched by the DBM 84 and the queue pair (QP) is checked out. When the QP context indicates that the SQ is hardware managed, the send processor 76 does not read WQE from memory, but instead requests a WQE from SQR. The SQR 86 should have prefetched WQE from the SQ head and have them available in its D-pool. The SQR 86 then provides a WQE to the send processor 76 (see data flow 158). After providing WQE, if the pool is empty, it may pre-fetch cache line of WQE from the memory SQ (see data flow 160). The send processor 76 processes the WQE and transmits the packet (see data flow 162). If the QP is enabled for WQE replenish, and if the WQE requests that the buffer be replenished, then the send processor 76 requests the receive queue replenisher (RQR) 82 to replenish the WQE. The RQR 82 may save the buffer in its pool, waiting for the receive packet processor (RPP) 66 to request it, or if the pool gets full, it may DMA a cache line worth of WQE to the tail of the SQ.

Terminology

A "receiving queue" is a portion of memory that receives and maintains an order among received packets. The receive queue may store the entirely of small packets or store a descriptors of memory buffers used to store data for large packets.

A "completion queue" is used, without limitation, to inform a device driver in the operating system that a frame has been received using one of the receive queues.

A "send queue" contains packet data or descriptors of transmit buffers containing packet data. Descriptors can also contain data. The data can be header or complete packet (in case of small packet).

A "queue pair" includes, without limitation, a receive queue and an associated send queue, typically as set out in a queue pair table entry. If the queue pair is software managed, as in the endpoint mode, then the queue pair may also have a send queue page table and a receive queue page table.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing network communications, comprising:
    operatively coupling an Ethernet adapter to a multi-core processor system via a processor bus;
    selectively assigning a first plurality of packets to a first queue pair for servicing in an endpoint mode;
    the multi-core processing system running a device driver, the device driver controlling the servicing of the first queue pair by dispatching the first plurality of packets to only one processor core of the multi-core processor system;
    selectively assigning a second plurality of packets to a second queue pair for servicing in a network node mode; and
    the Ethernet adapter controlling the servicing of the second queue pair by dispatching the second plurality of packets to multiple processor threads.

2. The method of claim 1, wherein the device driver controls the servicing of the first queue pair by dispatching the first plurality of packets to only one thread of the one processor core.

3. The method of claim 1, wherein the Ethernet adapter controls the servicing of the second queue pair by dispatching the second plurality of packets to multiple processor threads across multiple processor cores.

4. The method of claim 1, further comprising:
    selectively operating the Ethernet adapter to simultaneously service a first queue pair in an endpoint mode and service a second queue pair in a network node mode.

5. The method of claim 1, wherein the device driver further controls the flow of data from the one processor core to a first send queue in the Ethernet adapter in the endpoint mode.

6. The method of claim 5, wherein the multiple processor cores independently push data to a second send queue in the network node mode.

7. The method of claim 1, further comprising:
    providing a first plurality of queue pairs for servicing packets in an endpoint mode.

8. The method of claim 7, further comprising:
    providing a second plurality of queue pairs for servicing packets in a network node mode.

9. The method of claim 1, further comprising:
wrapping packets from a send processing element to a receive processing element.

10. The method of claim 1, further comprising:
automatically requeuing of a send buffer onto the receive queue in response to completing transmission of the data from the send buffer in network node mode.

11. The method of claim 1, further comprising:
assigning a queue pair number to each packet that is received by the receive buffer.

12. The method of claim 1, further comprising:
the multiple processor threads servicing multiple work queue elements from the single receive queue in network node mode; and
transferring packet data associated with the multiple work queue elements to the send queue.

13. The method of claim 1, further comprising:
assigning a flow identification to a plurality of packets received in the receive buffers in the network node mode; and
using the flow identification to assure that the plurality of packets are transmitted in the same order that they were received.

14. The method of claim 1, wherein the receive queue is stored in system memory, the method further comprising:
the receive packet processor sending packets to the system memory using direct memory access.

15. The method of claim 1, further comprising:
the Ethernet adapter communicating with system memory using direct memory access, wherein the system memory includes receive buffers, receive queues, a completion queue, send queues, and send buffers.

16. A host Ethernet controller, comprising:
a host interface configured for communication with a multicore processor over a processor bus, the host interface comprising:
   a receive processing element including a receive processor, a receive buffer and a scheduler for dispatching packets from the receive buffer to the receive processor;
   a send processing element including a send processor and a send buffer; and
   a completion queue scheduler (CQS) for dispatching completion queue elements (CQE) from the head of the completion queue (CQ) to threads of the multicore processor in a network node mode.

17. The host Ethernet controller of claim 16, further comprising:
a completion unit (CU) for managing the ordering of packets flowing through the host interface in the network node mode.

18. The host Ethernet controller of claim 16, further comprising:
a coprocessor command checker for monitoring the processor bus and taking coprocessor commands off the bus.

19. The host Ethernet controller of claim 16, further comprising:
a send queue replenish (SQR) for enqueuing and dequeuing buffers to the send queue; and
a receive queue replenish (RQR) for enqueuing and dequeuing buffers to the receive queue.

20. A computer program product including computer usable program code embodied on a non-transitory computer usable storage medium for controlling an Ethernet adapter coupled to a multi-core processor system via a processor bus, the computer program product comprising:
   computer usable program code for selectively assigning a first plurality of packets to a first queue pair for servicing in an endpoint mode;
   computer usable program code for running a device driver on the multi-core processing system, the device driver controlling the servicing of the first queue pair by dispatching the first plurality of packets to only one processor core of the multi-core processor system;
   computer usable program code for selectively assigning a second plurality of packets to a second queue pair for servicing in a network node mode; and
   computer usable program code for the Ethernet adapter controlling the servicing of the second queue pair by dispatching the second plurality of packets to multiple processor threads.

* * * * *